United States Patent
Komiya et al.

(10) Patent No.: US 8,134,586 B2
(45) Date of Patent: Mar. 13, 2012

(54) BEAM LIGHT SCANNING APPARATUS, IMAGE FORMING APPARATUS, AND METHOD FOR CONTROLLING GENERATION OF BEAM LIGHT

(75) Inventors: Kenichi Komiya, Kanagawa (JP); Koji Tanimoto, Shizuoka-Ken (JP); Daisuke Ishikawa, Shizuoka-Ken (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 1930 days.

(21) Appl. No.: 11/239,097

(22) Filed: Sep. 30, 2005

(65) Prior Publication Data

US 2006/0203263 A1   Sep. 14, 2006

(30) Foreign Application Priority Data

Mar. 11, 2005   (JP) ................... 2005-069857

(51) Int. Cl.
*B41J 2/435* (2006.01)
(52) U.S. Cl. ......... 347/247; 347/236; 347/237; 347/246
(58) Field of Classification Search .................. 347/247, 347/236, 237, 246
See application file for complete search history.

(56) References Cited

U.S. PATENT DOCUMENTS

| | | | | |
|---|---|---|---|---|
| 5,845,314 A | * | 12/1998 | Ishida | ............ 711/104 |
| 6,121,997 A | | 9/2000 | Fukushima | |
| 6,452,690 B1 | * | 9/2002 | Nakagawa | ............ 358/1.15 |
| 6,462,855 B1 | | 10/2002 | Komiya et al. | |
| 6,806,894 B2 | | 10/2004 | Seki | |
| 6,879,334 B2 | | 4/2005 | Ikeda | |
| 2001/0003463 A1 | * | 6/2001 | Tanimoto et al. | ............ 347/235 |
| 2003/0001945 A1 | | 1/2003 | Maeda | |
| 2003/0014570 A1 | | 1/2003 | Takei et al. | |
| 2003/0132940 A1 | | 7/2003 | Yamagata et al. | |

(Continued)

FOREIGN PATENT DOCUMENTS

| JP | 2001-091872 A | 4/2001 |
|---|---|---|
| JP | 2005-028871 A | 2/2005 |

OTHER PUBLICATIONS

K. Komiya, U.S. PTO Office Action, U.S. Appl. No. 11/239,098, May 25, 2007, 13 pages.

(Continued)

*Primary Examiner* — Stephen Meier
*Assistant Examiner* — Sarah Al Hashim
(74) *Attorney, Agent, or Firm* — Foley & Lardner LLP

(57) ABSTRACT

A beam light scanning apparatus capable of reducing influences of variations in characteristics of circuits disposed in a signal path extending until a laser driver and speeding up image data transfer for scan and exposure. Data of each line is distributed by an image data I/F into data trains of two channels, i.e., an odd-numbered pixel train and an even-numbered pixel train. The data in the two-channel trains are written by writing units into a plurality of memories in parallel for each of the trains in response to a line sync signal. During the same processing cycle as that for the writing, the data are read out of the memories in parallel by reading units. The data of two channels are combined by a multiplexer into a data train in the original order of pixels in each line, and a driving signal based on the combined data is generated by a PWM. A laser is driven by the driving signal.

14 Claims, 8 Drawing Sheets

U.S. PATENT DOCUMENTS

| | | | |
|---|---|---|---|
| 2003/0137697 A1* | 7/2003 | Sato et al. | 358/2.1 |
| 2004/0234135 A1* | 11/2004 | Nomizu | 382/209 |
| 2005/0007443 A1* | 1/2005 | Komiya et al. | 347/255 |
| 2005/0024483 A1* | 2/2005 | Ikeda | 347/249 |

OTHER PUBLICATIONS

K. Komiya, U.S. PTO Office Action, U.S. Appl. No. 11/239,098, Nov. 19, 2007, 10 pages.

K. Komiya et al., U.S. PTO Office Action, U.S. Appl. No. 11/237,902, dated Mar. 27, 2009, 15 pages.

U.S. Appl. No. 11/239,098, filed Sep. 30, 2005, Komiya et al.

U.S. Appl. No. 11/237,902, filed Sep. 29, 2005, Ishikawa et al.

K. Komiya, U.S. PTO Office Action, U.S. Appl. No. 11/239,098, May 23, 2008, 10 pages.

* cited by examiner

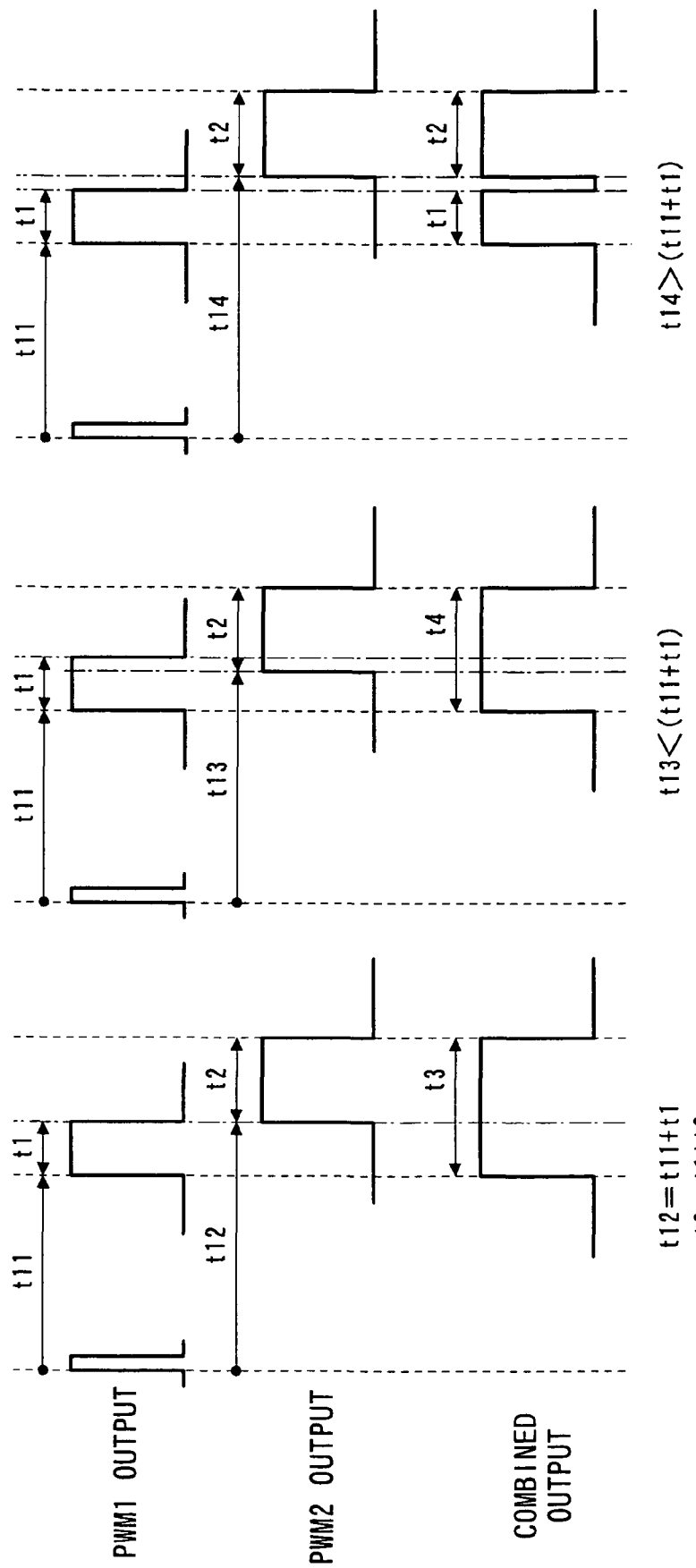

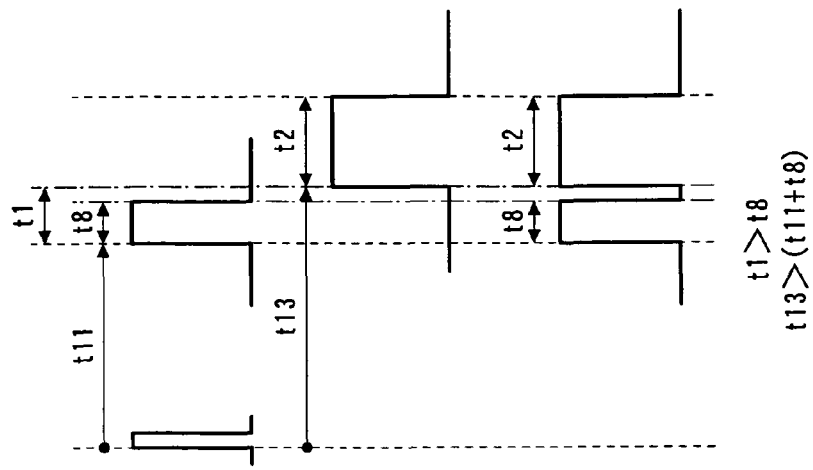
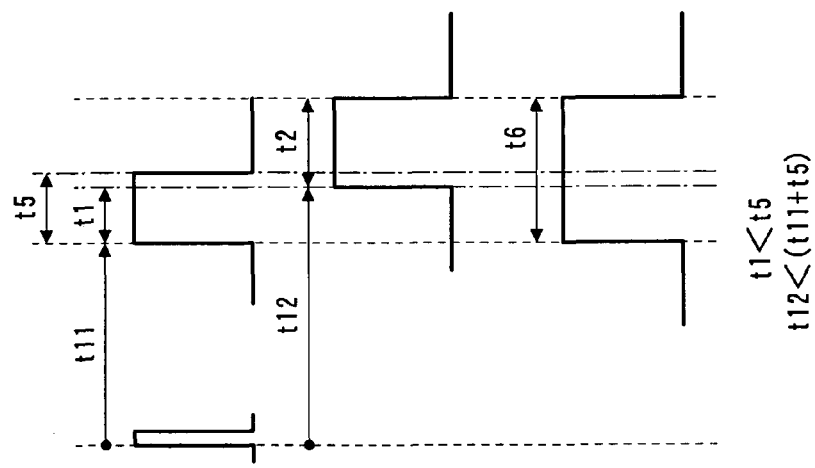
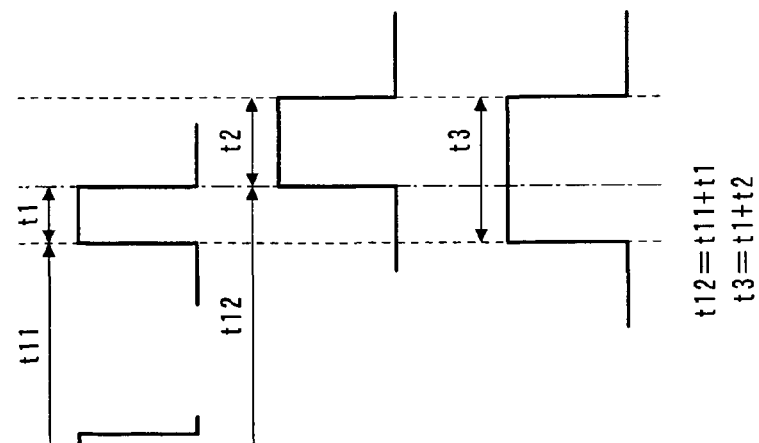
FIG. 8C
FIG. 8B
FIG. 8A

BEAM LIGHT SCANNING APPARATUS, IMAGE FORMING APPARATUS, AND METHOD FOR CONTROLLING GENERATION OF BEAM LIGHT

BACKGROUND OF THE INVENTION

1. Field of the Invention

The present invention relates to a beam light scanning apparatus for generating a beam light for scan, an image forming apparatus equipped with the beam light scanning apparatus, and a method for controlling generation of the beam light. More particularly, the present invention relates to a beam light scanning apparatus, an image forming apparatus, and a method for controlling generation of a beam light, which are suitable for, e.g., a copying machine and in which a transfer path of data corresponding to image information in each line is made up of plural channels extending until a driver for driving a light emitting unit that emits the beam light.

2. Description of the Related Art

Recently, various types of image forming apparatuses, such as digital copying machines and laser printers, have been developed and put already into practice in which an image is formed with a combination of scanned exposure using a laser beam light (hereinafter referred to simply as a "beam light") and an electrophotographic process.

That type of image forming apparatus operates based on the principle that the surface of a single photoconductor drum is scanned and exposed at the same time using the beam light to form a single electrostatic latent image on the surface of the photoconductor drum, and the electrostatic latent image is transferred to a sheet of paper.

In the field of that type of image forming apparatus, there has recently been a demand for, in particular, a speedup of image formation. To meet such a demand, Patent Document 1; Japanese Unexamined Patent Application Publication No. 2001-091872, for example, proposes an apparatus in which a plurality of laser oscillators are disposed and the surface of a photoconductor drum is scanned and exposed at the same time using the plurality of laser oscillators, to thereby form a latent image for each of lines in the direction of main scan (i.e., the axial direction of a rotary shaft of the photoconductor drum). However, using the plurality of laser oscillators is disadvantageous in making design complicated and increasing the size of an apparatus structure itself. Also, because of the necessity of accurately controlling scan intervals of beam lights emitted from the plurality of laser oscillators in the direction of sub-scan (i.e., the direction in which the drum surface is moved with the rotation and which is perpendicular to the direction of main scan on the surface of the photoconductor drum), a control process is complicated and a processing load is so increased as to impede realization of the speedup.

To solve the above-mentioned problem, Patent Document 2; Japanese Patent Application No. 2004-168425 proposes an apparatus in which a single laser oscillator is provided, while an image data transfer path extending until the laser oscillator is provided in plural. More specifically, the proposed apparatus includes an image processing unit for receiving image data supplied from a scanner unit, executing predetermined image processing on the received image data, and outputting the processed digital image data for each of lines while dividing the data into two channels, i.e., image data trains of odd-numbered lines and image data trains of even-numbered lines. The image processing unit is associated with two channels of serial circuits made up of PWM's for processing the image data trains of the respective channels and laser drivers. Output terminals of the laser drivers in the respective channels are connected, for example, to the single laser oscillator via a wired OR circuit. With such an arrangement, the single laser oscillator can be driven with data transfer via the two lines, and the above-mentioned disadvantage of Patent Document 1 can be avoided.

Patent Document 2 also discloses, as a modification of the image data transfer circuit of plural channels, a circuit using a single laser driver wherein two PWM's for respectively PWM-modulating image data obtained from odd-numbered pixels and image data obtained from even-numbered pixels in parallel are disposed on the output side of the image processing unit, outputs of the two PWM's are combined with each other via an OR circuit, and the single laser driver is connected to an output of the OR circuit.

However, the arrangement disclosed in Patent Document 2 still has a drawback to be overcome. The drawback is caused by variations in performance attributable to the individual difference between the PWM for the odd-numbered pixel trains and the PWM for the even-numbered pixel trains.

That drawback will be described below with reference to FIGS. 7 and 8. In the following description, the PWM for the odd-numbered pixel trains is called PWM1 and the PWM for the even-numbered pixel trains is called PWM2.

FIG. 7A represents an example in which an output (pulse width: t1) of PWM1 and an output (pulse width: t2) of PWM2 are combined to produce a PWM output signal with a pulse width of t3=t1+t2. The outputs of PWM1 and PWM2 are issued after delays of t11 and t12, respectively, in sync with a common horizontal sync signal (BD signal). If there are no variations in the designated pulse widths, a combined output of t3=t1+t2 is produced.

On the other hand, FIG. 7B represents an example in which, because of an error caused in synchronization accuracy of PWM2, the output of PWM2 which should be issued after t12 is issued after t13. In this example, the combined output has a pulse width of t4 (t4<t3). Accordingly, a pulse width smaller than the desired value is resulted.

Further, FIG. 7C represents an example in which, because of an error caused in synchronization accuracy of PWM2, the output of PWM2 which should be issued after t12 is issued after t14. In this example, a combined pulse has a "split" and is separated into two pulses.

FIG. 8A similarly represents an example in which an output (pulse width: t1) of PWM1 and an output (pulse width: t2) of PWM2 are combined to produce a PWM output signal with a pulse width of t3=t1+t2. The outputs of PWM1 and PWM2 are issued after delays of t11 and t12, respectively, in sync with a common horizontal sync signal (BD signal). If there are no variations in the designated pulse widths, a combined output of t3=t1+t2 is produced.

Also, FIG. 8B represents an example in which, because of an error caused in pulse width of PWM1, the output of PWM1 which should be issued with the pulse width of t1 is issued with a pulse width of t5 (t5>t1). In this example, the combined output has a pulse width of t6=t1+t2 and the pulse width is not changed.

On the other hand, FIG. 8C represents an example in which, because of an error caused in pulse width of PWM1, the output of PWM1 which should be issued with the pulse width of t1 is issued with a pulse width of t8 (t8<t1). In this example, a combined pulse signal has a "split" and is separated into two pulses.

Thus, because of errors in synchronization accuracy or variations in pulse width between PWM1 and PWM2, the combined PWM output is apt to have a pulse width differing from the desired value or to cause a "split", and an image is apt to show thickening or thinning of lines or to include white streaks. This results in deterioration of image quality.

SUMMARY OF THE INVENTION

In view of the above-mentioned problems with the known image forming apparatuses, an object of the present invention is to provide a beam light scanning apparatus, an image forming apparatus, and a method for controlling generation of a beam light, which are less subjected to influences of variations in characteristics of circuits disposed in a signal path extending until a laser driver for a laser oscillator, and which can contribute to realizing high-speed image formation by speeding up image data transfer for scan and exposure of a target image line by line.

To achieve the above object, a beam light scanning apparatus according to an aspect of the present invention includes a light emitting unit for emitting a beam light for scan; a distributing unit for distributing data based on image information per pixel of a target image in each line in a direction of main scan into data trains of plural channels; a plurality of memories provided corresponding to the data trains of plural channels, each memory allowing reading and writing of the data; a data writing unit for writing the data in the data trains of plural channels distributed by the distributing unit into the plurality of memories in parallel for each of the trains in response to a line sync signal; a data reading unit for reading the data out of the plurality of memories in parallel during the same processing cycle corresponding to the line sync signal; a combining unit for combining the data of plural channels read by the data reading unit into a data train in the original order of pixels in each line; and a control unit for generating a driving signal based on the data combined by the combining unit and controlling operation of the light emitting unit by the driving signal.

According to the present invention, it is possible to reduce influences of variations in characteristics of circuits disposed in a signal path extending until a driver for a light emitting unit, such as a laser oscillator, and to speed up image data transfer for scan and exposure of the target image line by line.

BRIEF DESCRIPTION OF THE DRAWINGS

FIGS. 7A-7C are timing charts comparatively showing, by way of example, drawbacks (FIGS. 7B and 7C) caused by deviations between two PWM outputs in the related art and an ideal case (FIG. 7A) of the two PWM outputs; and FIGS. 8A-8C are timing charts comparatively showing, by way of example, other drawbacks (FIGS. 8B and 8C) caused by deviations between two PWM outputs in the related art and an ideal case (FIG. 8A) of the two PWM outputs.

DESCRIPTION OF THE PREFERRED EMBODIMENTS

One embodiment of the present invention will be described below with reference to FIGS. 1-6. In the following, the embodiment is described in connection with a digital copying machine that embodies not only a beam light scanning apparatus according to the present invention, but also an image forming apparatus equipped with the beam light scanning apparatus. The digital copying machine may be practiced as a standalone machine or as a part of an MFP system.

Figure 1:
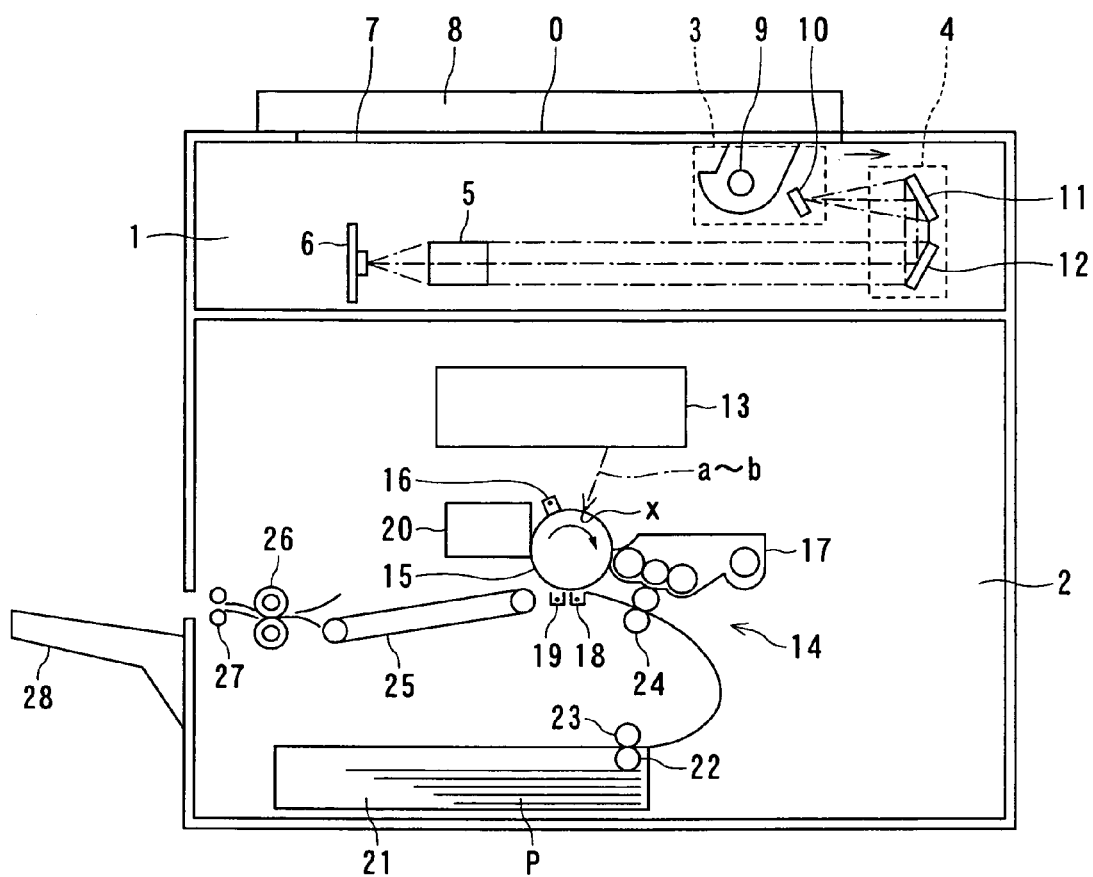
FIG. 1 is a schematic view for explaining an outline of a digital copying machine as one example of an image forming apparatus according to one embodiment of the present invention.

FIG. 1 schematically shows the construction of the digital copying machine. The digital copying machine includes, for example, a scanner unit 1 serving as image reading means and a printer unit 2 serving as image forming means. The scanner unit 1 includes a first carriage 3 and a second carriage 4 which are movable in the direction indicated by an arrow, a focusing lens 5, a photoelectric transducer 6, etc.

In the construction shown in FIG. 1, an original document O is placed on a document platen 7 made of a transparent glass to face downward. The basis for placement of the document O is defined such that a center basis is given by the front right side of the document platen 7 as viewed in the direction of a shorter side of the document platen 7. The document O is pressed against the document platen 7 by a document fixing cover 8 attached to be capable of freely opening and closing.

The document O is illuminated by a light source 9, and a light reflected by the document O is collected onto a light receiving surface of the photoelectric transducer 6 through mirrors 10, 11 and 12 and the focusing lens 5. The first carriage 3 mounting the light source 9 and the mirror 10 thereon and the second carriage 4 mounting the mirrors 11, 12 thereon are moved at a relative speed of 2:1 so that an optical path length is held constant. The first carriage 3 and the second carriage 4 are moved by a carriage driving motor (not shown) in the direction toward the right from the left, as viewed on FIG. 1, in sync with a read timing signal.

In such a way, an image of the document O placed on the document platen 7 is sequentially read by the scanner unit 1 line by line. A read output is converted in an image processing unit 57 (see FIG. 3) to a digital image signal of, e.g., 8 bits, which represents light and dark of the image.

The printer unit 2 includes an optical system unit 13 and an image forming section 14 capable of forming an image on a sheet of paper P, i.e., a medium on which the image is to be formed, according to the electrophotographic process in combination with the optical system unit 13. More specifically, an image signal read by the scanner unit 1 from the document O is processed by the image processing unit 57 (see FIG. 3) and then converted to a laser beam light (hereinafter referred to simply as a "beam light") emitted from a semiconductor laser oscillator (hereinafter referred to simply as a "laser") 31 (see FIG. 2). This embodiment employs, by way of example, a single beam optical system including one laser.

Although details of the optical system unit 13 will be described later with reference to FIG. 2, one laser 31 disposed in the optical system unit 13 is operated so as to emit a beam light in accordance with a laser modulation signal outputted from the image processing unit 57, and the emitted beam light is reflected by a polygon mirror to become a scan light that is outputted externally of the optical system unit 13.

The beam light irradiated from the optical system unit 13 is focused as the scan light in the form of a spot having a required resolution at an exposure position X (see FIG. 1) on a photoconductor drum 15, which serves as an image carrier, for performing scan and exposure line by line. As a result, an electrostatic latent image corresponding to the image signal is formed on the surface of the photoconductor drum 15.

Around the photoconductor drum 15, there are disposed an electrical charger 16 for charging the drum surface with electricity, a developing unit 17, a transfer charger 18, a peeling-off charger 19, a cleaner 20, and so on. The photoconductor drum 15 is rotated at a predetermined outer circumferential speed by a driving motor (not shown) and is charged with electricity by the electrical charger 16 disposed opposite to the drum surface. At the exposure position X on the photoconductor drum 15 thus charged with electricity, the beam light (scan light) is focused in the form of a spot.

The electrostatic latent image formed on the surface of the photoconductor drum 15 is developed with a toner (developer) supplied from the developing unit 17. With the rotation of the photoconductor drum 15 including the toner image formed by the development, the toner image is transferred at a transfer position by the transfer charger 18 to the sheet of paper P that is supplied at the matched timing from a paper supply system.

In the paper supply system, sheets of paper P set in a paper supply cassette 21 disposed at the bottom are individually separated and supplied one by one with a combination of a paper feed roller 22 and a separating roller 23. After reaching a register roller 24, the sheet of paper P is further fed to the transfer position at the predetermined timing. Downstream of the transfer charger 18, there are disposed a paper conveying mechanism 25, a fusing unit 26, and a paper ejection roller 27 for ejecting the sheet of paper P on which the image has been formed. The toner image transferred to the sheet of paper P is fused and fixed by the fusing unit 26. Then, the sheet of paper P is ejected through a paper ejection roller 27 onto an ejected paper tray 28 disposed outside the machine.

The photoconductor drum 15 from which the toner image has been transferred to the sheet of paper P is returned to an initial state after the toner remaining on the drum surface has been removed by the cleaner 20, followed by coming into a standby state for a next cycle of image formation.

By repeating the above-described process steps, the image forming operation is successively performed.

Thus, the document O placed on the document platen 7 is read by the scanner unit 1, and read information is recorded as a toner image on the sheet of paper P after being subjected to a series of the process steps in the printer unit 2.

The optical system unit 13 will be described below.

Figure 2:
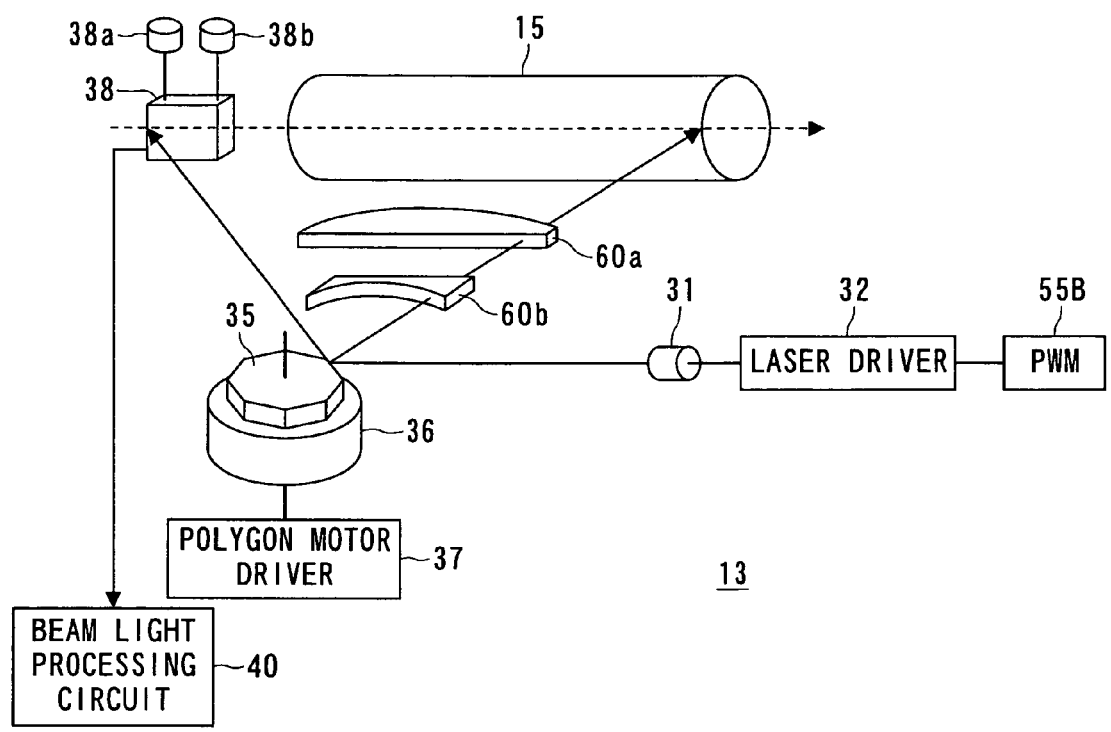
FIG. 2 is a schematic view for explaining an optical system of the image forming apparatus according to the embodiment.

FIG. 2 shows components of the optical system unit 13 and the positional relationships between those components and the photoconductor drum 15. The optical system unit 13 includes, as mentioned above, the laser (semiconductor laser oscillator) 31 serving as one beam light emitting means. The laser 31 emits the beam light to perform the image formation in units of one scan line. The laser 31 is driven by a laser driver 32, and the beam light emitted from the laser 31 impinges upon a polygon mirror 35, i.e., a multi-faced rotating mirror, after passing through a collimator lens (not shown).

The polygon mirror 35 is rotated at a constant speed by a polygon motor 36 that is driven by a polygon motor driver 37. Therefore, the light reflected by the polygon mirror 35 is scanned in a certain direction at an angular speed determined depending on the rotation speed of the polygon motor 36. The beam light scanned by the polygon mirror 35 passes through an f-θ lens (not shown) having a particular f-θ characteristic. As a result, the beam light scans a light receiving surface of a beam light detector 38 and the surface of the photoconductor drum 15 at a constant speed. The beam light detector 38 functions as beam-light passage timing detecting means.

The laser driver 32 includes an APC circuit. While comparing an output detected by a light intensity sensor (PD) included in the laser 31 with a power level of the emitted beam light set by a main control unit (CPU) 51 (described later), the APC circuit executes control so that the detected power is kept equal to the set power level and the laser 31 is always steadily operated to emit the beam light.

Also, the beam light detector 38 is provided with adjustment motors 38a, 38b for adjusting the mount position of the beam light detector 38 and the inclination thereof with respect to the scan direction of the beam light.

The beam light detector 38 detects, as mentioned above, the passage position, the passage timing and the power (light intensity) of the beam light scanning the surface of the photoconductor drum 15. The beam light detector 38 is disposed near one end of the photoconductor drum 15 such that the light receiving surface of the beam light detector 38 is equivalent to the surface of the photoconductor drum 15 from the positional aspect. Control of the laser 31 and control of the light emission timing (i.e., control of the image formation position in the direction of main scan) are executed in accordance with a detected signal from the beam light detector 38. In particular, the control of the light emission timing includes transfer control of image data according to the present invention. This transfer control is executed using a horizontal sync signal (BD) outputted from the beam light detector 38 with the function of detecting the passage position of the beam light.

The beam light detector 38 is connected to a beam light processing circuit 40 for producing signals to execute the above-mentioned control. The beam light processing circuit 40 receives various detected signals from the beam light detector 38 and supplies detection pulse signals (including the horizontal sync signal (BD)), which represent the passage position and the passage timing of the beam light, to the main control unit 51 and a laser control unit 55 described later.

A control system will be described below.

Figure 3:
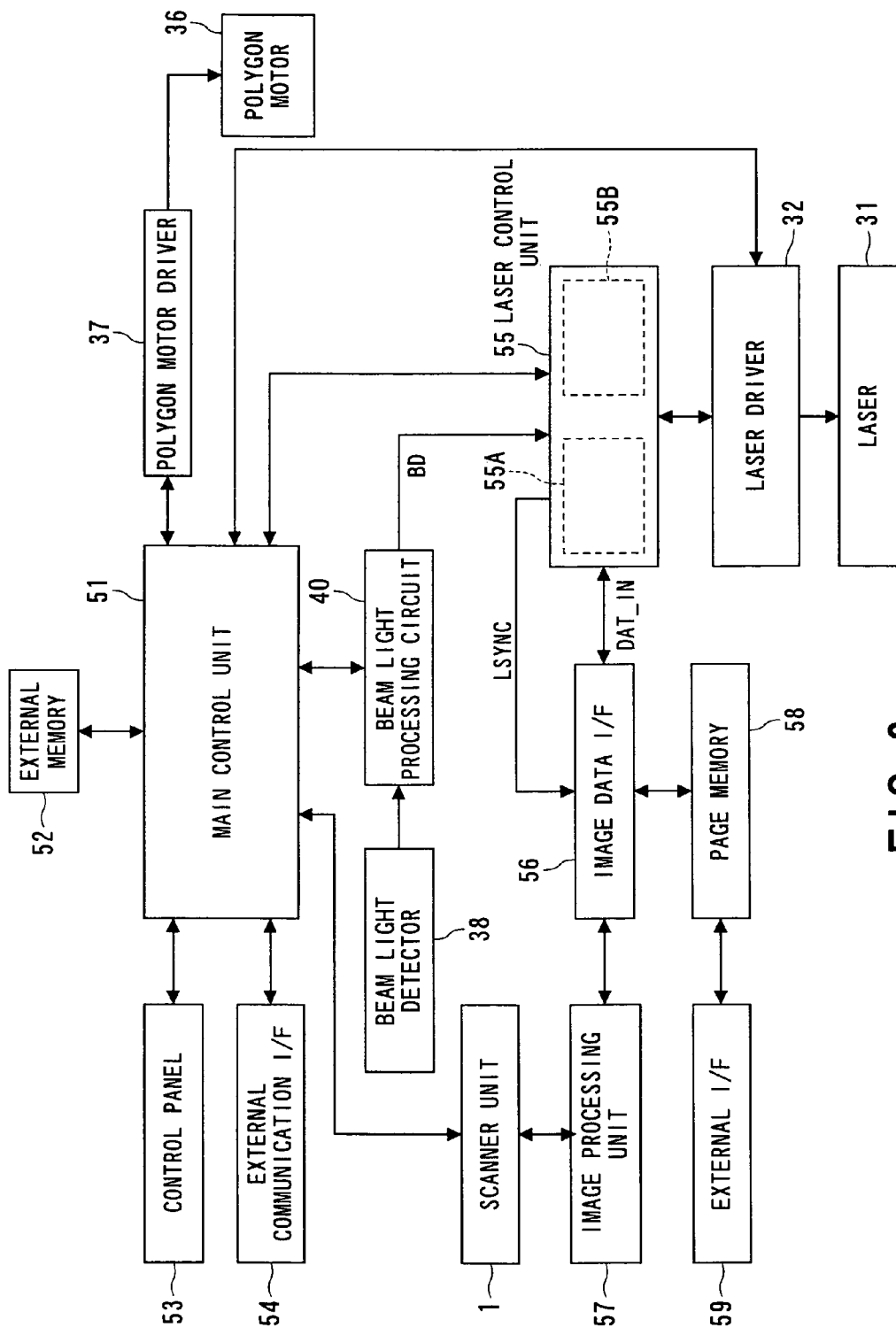
FIG. 3 is a block diagram for explaining an outline of a control system according to the embodiment.

FIG. 3 shows the control system primarily executing control of the single beam optical system. The control system includes the main control unit 51 for executing overall electric control in the copying machine. The main control unit 51 includes, for example, a CPU, a memory, and a clock circuit (all not shown). Also, connected to the main control unit 51 are an external memory 52, a control panel 53, an external communication interface (I/F) 54, the laser driver 32, the polygon motor driver 37, the beam light processing circuit 40, the scanner unit 1, and the laser control unit 55 each in a communicable manner.

Among those components, the laser control unit 55 is connected to not only the beam light processing circuit 40, but also to an image data I/F 56, as shown in FIG. 3. The image processing unit 57 is connected to the laser control unit 55 via the image data I/F 56 so that the image data can be outputted to the laser control unit 55. Further, an external I/F 59 is connected to the image data I/F 56 via a page memory 58.

In copying operation, the image of the document O set on the document platen 7 is read by the scanner unit 1 and sent to the image processing unit 57. The image processing unit 57 performs predetermined known processing, such as a shading modification, various filtering processes, a degradation process and a gamma modification, and then outputs processed digital image data to the image data I/F 56.

The image data I/F 56 having received the image data (DAT_IN) outputs the image data while distributing it into two channels, i.e., a train of image data (DAT_ODD) consisted of only odd-numbered pixels and a train of image data (DAT_EVEN) consisted of only even-numbered pixels.

Figure 4:
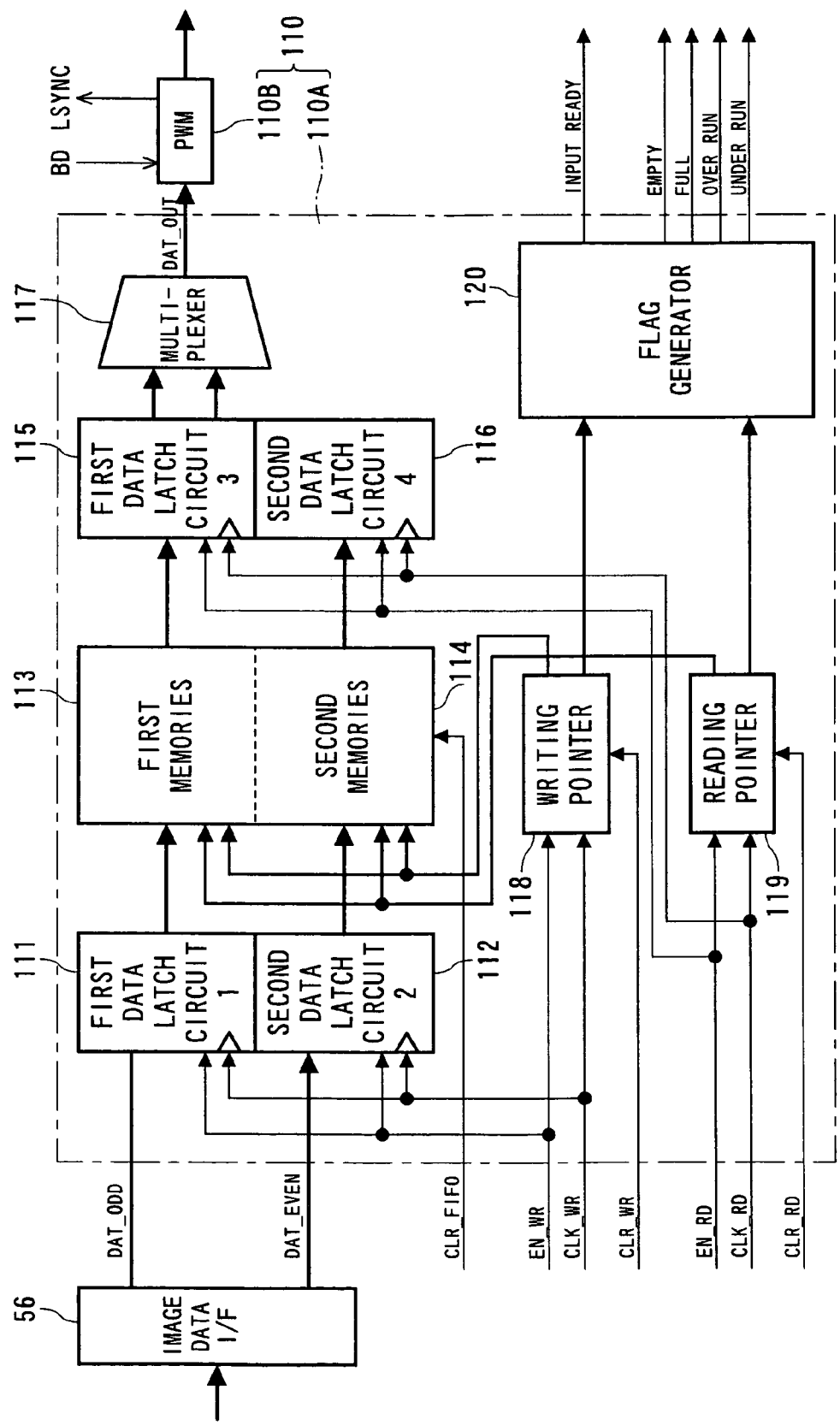
FIG. 4 is a block diagram showing the configuration of a laser control unit in the control system according to the embodiment.

The laser control unit 55 includes, as shown in FIG. 4, a delay control circuit 55A for delaying the image data of the odd-numbered pixel train and the even-numbered pixel train (DAT_ODD, DAT_EVEN) for each of the trains, which have been inputted via the image data I/F 56, and outputting them as combined data of one pixel train (DAT_OUT), and a PWM circuit 55B for executing PWM on the image data (DAT_OUT) delayed by the delay control circuit 55A, to thereby produce a PWM-modulated signal.

Among those components, the delay control circuit 55A is configured as one example embodying the feature of the present invention. More specifically, the delay control circuit 55A includes first and second data latch circuits 111, 112 for writing, first and second memories 113, 114 capable of writing and reading data on the FIFO basis, first and second data latch circuits 115, 116 for reading, a multiplexer 117 for combining different trains of data, a writing pointer 118 for use in data write control, a reading pointer 119 for use in data read control, and a flag generator 120 for generating flag information indicating the state of the delay control.

Among those components, the first and second data latch circuits 111, 112 for writing are connected respectively to the first and second memories 113, 114. Then, the first and second memories 113, 114 are connected respectively to the first and second data latch circuits 115, 116 for reading. Further, the first and second data latch circuits 115, 116 for reading are connected to the multiplexer 117 having two inputs and one output.

A write enable signal (EN_WR) and a write data clock (CLK_WR) are applied to each of the first and second data latch circuits 111, 112 for writing. A read enable signal (EN_RD) and a read data clock (CLK_RD) are applied to each of the first and second data latch circuits 115, 116 for reading. The write enable signal (EN_WR) and the write data clock (CLK_WR) are also applied to the writing pointer 118. The read enable signal (EN_RD) and the read data clock (CLK_RD) are also applied to the reading pointer 119.

With that arrangement, the first and second data latch circuits 111, 112 for writing latch the image data (DAT_ODD, DAT_EVEN) from the image data I/F 56 in sync with the write enable signal (EN_WR) and the write data clock (CLK_WR). Then, the image data (DAT_ODD, DAT_EVEN) latched by the first and second data latch circuits 111, 112 are written into the first and second memories 113, 114 in accordance with an output value of the writing pointer 118. Further, the first and second data latch circuits 115, 116 for reading latch the image data (DAT_ODD, DAT_EVEN) from the first and second memories 113, 114 in accordance with an output value of the reading pointer 119 and in sync with the read enable signal (EN_RD) and the read data clock (CLK_RD). In this latching step, i.e., in the reading step, the train of the odd-numbered pixel data and the train of the even-numbered pixel data are separately subjected to the delay control as described later.

The image data (DAT_ODD, DAT_EVEN) read out of the first and second data latch circuits 115, 116 are sent to the multiplexer 117 at respective predetermined timings. With the input alternately switching function of the multiplexer 117, therefore, the image data (DAT_ODD, DAT_EVEN) are rearranged into the time-serial image data (DAT_OUT) in which the odd-numbered pixels and the even-numbered pixels are arrayed in proper order. The image data (DAT_OUT) is transferred from the multiplexer 117 to the PWM circuit 55B.

The write enable signal (EN_WR), the write data clock (CLK_WR), the read enable signal (EN_RD), and the read data clock (CLK_RD) are supplied from the main control unit 51. However, a circuit for generating those enable signals and clocks may be disposed in the laser control unit 55.

The flag generator 120 generates, as mentioned above, flags indicating the states of the memories 113, 114 as follows:
EMPTY: the difference between the writing pointer value and the reading pointer value is 0 (memory is empty)
FULL: the writing pointer value is matched with a memory maximum value (memory is full)
OVER RUN: the writing pointer value exceeds the memory maximum value
UNDER RUN: the reading pointer value exceeds a memory lower limit value
INPUT READY: state other than the above
The signals indicating those flag states are sent to the main control unit 51 and are used for control in the main control unit 51.

In addition to the above-described configuration, as shown in FIG. 4, a memory clear signal (CLR_FIFO) is supplied to the memories 113, 114, a writing pointer clear signal (CLR_WR) is supplied to the writing pointer 118, and a reading pointer clear signal (CLR_RD) is supplied to the reading pointer 119. Although those clear signals (CLR_FIFO, CLR_WR, CLR_RD) are supplied from the main control unit 51 in this embodiment, a circuit for generating those clear signals may be disposed in the laser control unit 55.

Among those clear signals, the memory clear signal (CLR_FIFO) is a signal for clearing the memories 113, 114. When this signal is asserted by the memories 113, 114, the data stored in the memories 113, 114 are cleared (e.g., all zeros). The writing pointer clear signal (CLR_WR) is a signal for clearing the data in the writing pointer 118. When this signal is asserted by a control section of the writing pointer 118, the written data held by the writing pointer 118 is reset to zero. Further, the reading pointer clear signal (CLR_RD) is a signal for clearing the data in the reading pointer 119. When this signal is asserted by a control section of the reading pointer 119, the read data held by the reading pointer 119 is reset to zero.

The reason why those clear signals are used will be described below. The memories 113, 114 are each controlled by the writing pointer 118 and the reading pointer 119 such that writing and reading are held in equivalent relation to each other (i.e., data is read in the same amount as data written). At that time, due to noises, etc. superimposed on the clocks (CLK_WR and CLK_RD), there may occur the case where writing and reading are not in equivalent relation to each other. Such a case accompanies a risk of causing an error, e.g., an OVER RUN error or an UNDER RUN error, depending on the memory capacity and the number of data. These errors lead to deterioration of image quality because the data read out of the memories 113, 114 differ from the predetermined data and a desired image is not resulted. In that case, therefore, those clear signals are asserted to return the memories and the pointers to their initial states, followed by starting the image forming operation again.

Also, in the case free from the above-mentioned errors, it is possible to minimize the influence of the errors (deterioration of image quality) by periodically clearing the memories 113, 114 and the pointers 118, 119.

One example most effective in achieving the above purpose is a method of clearing the memories 113, 114 and the pointers 118, 119 whenever one line has been formed. With this method, even if the equivalent relation between writing and reading is lost due to abrupt noise, etc., the resulting influence appears only in one line. Such a method can be realized by arranging the circuit connections so as to make each of the memory clear signal (CLR_FIFO), the writing pointer clear signal (CLR_WR), and the reading pointer clear signal (CLR_RD) outputted in sync with the BD signal. As a result, the memories 113, 114 and the pointers 118, 119 are cleared per line (namely, whenever the BD signal is outputted).

As another example, it is also effective to clear the memories 113, 114 and the pointers 118, 119 whenever the page printing operation is completed. For example, the memories 113, 114 and the pointers 118, 119 are cleared when an EOP signal is at a low level. In other words, the circuit connections are arranged so as to clear the memories 113, 114 and the pointers 118, 119 within an interval between two sheets of paper (sheet interval) in continuous printing operation, or to clear them in periods before and after one sheet of paper in intermittent printing operation. In this example, since a sufficient time margin is ensured for the clear timing, the main control unit (CPU) 51 may also be used to assert the clear signals.

The PWM circuit 55B shown in FIG. 4 executes PWM on a pulse signal in accordance with the image data (DAT_OUT) transferred via the delay control circuit 55A, to thereby produce a PWM modulated signal. The PWM modulated signal is sent as a driving signal (pulse signal) to the laser driver 32. The laser driver 32 drives the laser 31 in accordance with the driving signal.

Returning to FIG. 3, the control panel 53 is a man-machine interface allowing an operator to, for example, start the copying operation and set the number of copies.

The digital copying machine of this embodiment can operate so as to not only perform the copying operation, but also to form an image by using image data inputted from the outside via the external I/F 59 that is connected to the page memory 58. The image data inputted via the external I/F 59 is temporarily stored in the page memory 58 and then sent to the laser control unit 55 via the image data I/F 56.

Further, when the digital copying machine of this embodiment is controlled from the outside via a network, for example, the external communication I/F 54 takes the role of the control panel 53.

The polygon motor driver 37 is a driver for driving the polygon motor 36 to rotate the polygon mirror 35 for scanning the beam light. The main control unit 51 can control the polygon motor driver 37 so as to start and stop the rotation and to change the rotation speed. The rotation speed is changed as required, for example, in a standby state where the rotation speed should be reduced from a predetermined speed.

The laser driver 32 has the functions of not only causing the laser beam to be emitted in accordance with the modulated signal supplied from the laser control unit 55 in sync with scan of the beam light as described above, but also forcibly operating the laser 31 to emit the beam light regardless of the image data in response to a forced light emission signal from the main control unit 51.

Also, the main control unit 51 sets, for the laser driver 32, the power for operating the laser 31 to emit the beam light. The setting of the light emission power is modified depending on, e.g., changes of process conditions.

The memory 52 stores information necessary for the control.

The operation and advantages of this embodiment will be described below with reference to FIGS. 5 and 6 while laying a focus on the operation and advantages of the laser control unit 55.

Figure 5:
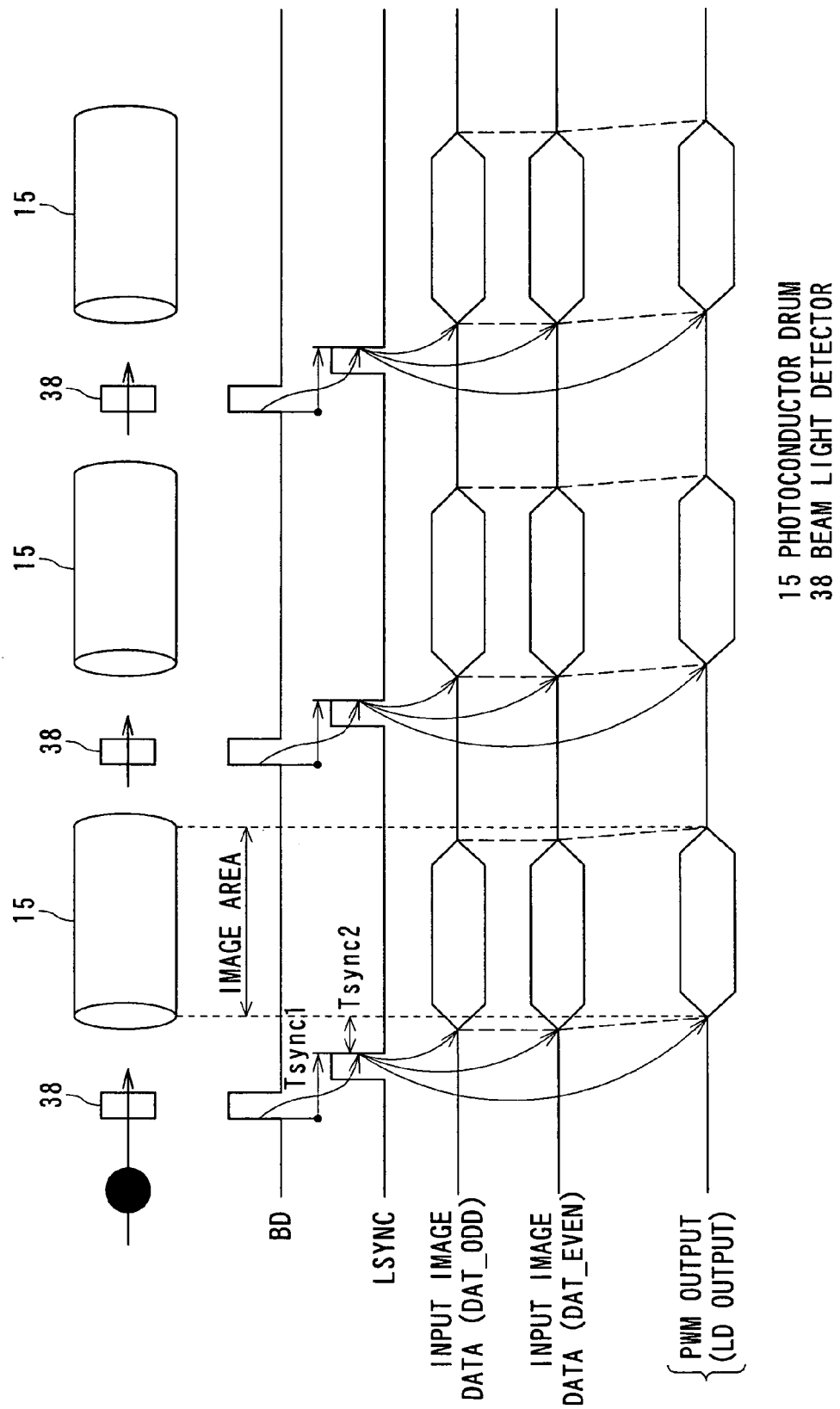
FIG. 5 is a timing chart for explaining the concept of delay control executed in the embodiment.

FIG. 5 shows time relationships among the BD signal, an LSYNC signal, the image data (DAT_ODD, DAT_EVEN) before delay, and the PWM output (PWM modulated signal, i.e., driving signal) resulting from the image data after delay when the beam light reflected by the polygon mirror 35 scans an image area on the photoconductor drum 15. The time relationships shown in FIG. 5 can be depicted in more detail as a timing chart of FIG. 6.

The beam light detector 38 serving also as the horizontal sync sensor detects the passage timing of the scan beam light that is scanned by the polygon mirror in the direction indicated by an arrow. In response to the detection, the beam light processing circuit 40 generates a horizontal sync signal (BD).

The BD signal is further supplied to the PWM circuit 55B of the laser control unit 55. Upon receiving the BD signal, the PWM circuit 55B outputs a line sync signal (LSYNC) to the image data I/F 56 in sync with the BD signal after a certain delay time Tsync1, as shown in FIGS. 5 and 6.

Upon receiving the LSYNC signal, the image data I/F 56 makes the write enable signal (EN_WR) effective for writing the data into the FIFO memories 113, 114. Correspondingly, the image data I/F 56 transfers the odd-numbered pixel image data (DAT_ODD) and the even-numbered pixel image data (DAT_EVEN) to the first and second data latches 111, 112 for the FIFO memories 113, 114 at the same time in parallel, respectively, in sync with the data transfer clock (CLK_WR) that is in turn in sync with the LSYNC signal.

The first and second data latches 111, 112 latch the data in response to the data transfer clock (data write clock: CLK_WR). In this embodiment, CLK_WR=50 MHz is set as one example.

The writing pointer 118 executes writing of input data into memories in such a manner that the data latched by the first and second data latches 111, 112 are written into the first and second memories 113, 114. More specifically, the odd-numbered pixel image data (DAT_ODD) is written into the first memory 113, and the even-numbered pixel image data (DAT_EVEN) is written into the second memory 114. The writing pointer 118 manages the number and order of the written data.

On the other hand, the reading pointer 119 executes management of reading of the data having been written into the first and second memories 113, 114 (regarding the number and order of the read data). In this embodiment, the read data clock (CLK_RD) corresponds to an image formation clock. As one example, CLK_RD=100 MHz is set.

When the image data I/F 56 outputs the read enable signal (EN_RD) in sync with the LSYNC signal, the read data clock (CLK_RD) in sync with the LSYNC signal is applied to the reading pointer 119. Responsively, the reading pointer 119 reads the image data, which have been temporarily stored in the first and second memories 113, 114, in the same order as the written data via the first and second data latch circuits 115, 116, respectively. The read image data are sent to the multiplexer 117 while remaining separated to the odd-numbered pixel image data (DAT_ODD) and the even-numbered pixel image data (DAT_EVEN). In the multiplexer 117, those data are combined with each other. Subsequently, the combined image data (DAT_OUT) is transferred to the PWM circuit 55B.

One example of that reading operation will be described below. First, a read clock is synchronized with a tailing edge of the LSYNC signal by using a synchronizing circuit (not shown) that is included in, e.g., the image data I/F 56. The thus-synchronized clock is used as the read data clock (CLK_RD). The synchronizing circuit may be included in the laser control unit 55 or in the delay control circuit 55A. As an alternative, the synchronizing circuit may be included in the main control unit 51.

The read enable signal (EN_RD) is outputted through the image data I/F 56 while counting the read data clock (CLK_RD) in sync with the LSYNC signal. In the case of FIG. 6, the read enable signal (EN_RD) is made effective after counting seven read data clocks (CLK_RD). Responsively, the read data clock (CLK_RD) is applied to the reading pointer 119, and the reading pointer 119 reads the data out of the first and second memories 113, 114 in the same order as the written data. In other words, a first pixel is read at an eighth clock counted from the tailing edge of the LSYNC signal.

Also, the number of pixels is managed by counting the number of the read data clocks (CLK_RD) after the read enable signal (EN_RD) has been made effective. In the case of FIG. 6, because the input data consists of 8 odd-numbered pixels and 8 even-numbered pixels, the read enable signal (EN_RD) is made ineffective after counting 16 clocks in total.

Thus, a delay amount from writing to reading of the data can be adjusted by controlling a delay time Tsync2 from the time of the tailing edge of the LSYNC signal to the timing at which the read enable signal (EN_RD) is enabled (exactly speaking, the timing at which the read data clock (CLK_RD) is made effective by the reading pointer 119 (or a delayed time at which the data are read out of the first and second memories 113, 114 storing the odd-numbered pixel data train and the even-numbered pixel data train, respectively).

The delay time Tsync2 can be set in the range of:

0<Tsync2<maximum value of memory capacity

In principle, the maximum value of the memory capacity means a maximum value of the storage capacity of each memory 113, 114. Because of delays (such as a delay in the writing operation and a delay in the reading operation) occurred in memory peripheral circuits, however, an actually settable delay time is given as a time (or the number of clocks corresponding to the time) obtained by subtracting those delays from the maximum value of the memory capacity. A value set as the delay time depends on the circuit configuration. For example, when the number of pixels per line is 8000 (FIG. 6 shows the number of pixels just by way of illustration), each of the memories 113, 114 has a capacity of 256 pixels (maximum value). A memory having a capacity equal to or over 1 line is generally called a line memory. A circuit configuration using such a line memory is not intended by the delay control according to the present invention. With the delay control intended by the present invention, the delay is performed within the same line.

The setting of the delay time Tsync2 enables the read timing to be set in consideration of a state where the processing in the upstream side has progressed to some extent. The read timing represents a point in time at which the processing of the image data of each line has been advanced by the image processing unit 57 and the processed image data has been written in the FIFO memories 113, 114 to some extent. Upon reaching that read timing, therefore, the reading of the image data from the FIFO memories 113, 114 is started to form an actual image of each line.

Also, because the above-mentioned read timing of the image data is in sync with the BD signal and the LSYNC signal, there occurs no image deviation in the direction of main scan during the image formation for each line.

Figure 6:
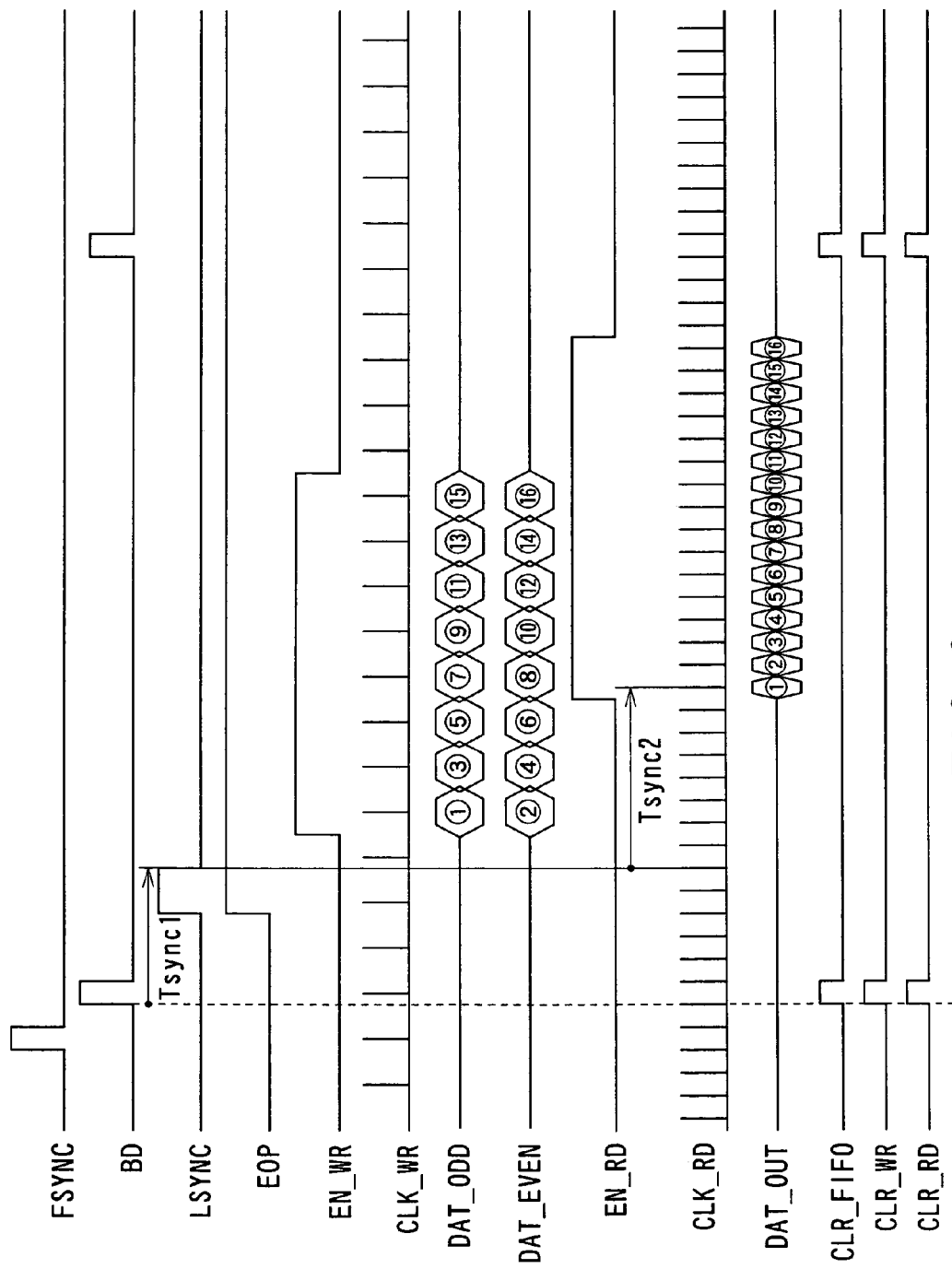
FIG. 6 is a timing chart for explaining details of the delay control executed in the embodiment.

Additionally, the EOP signal shown in FIG. 6 represents a signal indicating an image area in the direction of sub-scan (paper feed direction) perpendicular to the direction of main scan in which the beam light is scanned (i.e., a signal indicating an image area in one page). Lines are formed in number corresponding to the number of LSYNC signals outputted in a period during which the EOP signal is effective (i.e., it takes a high level). The EOP signal is also supplied from, e.g., the main control unit 51.

With this embodiment, as described above, image data of a target image in each line in the direction of main scan is processed and supplied in response to the sync signal. On the other hand, acquisition of the image data is started after the certain time Tsync2 from the LSYNC signal. Hence, the image data can be reliably acquired and used to drive the light emitting means.

Particularly, this embodiment can avoid the drawback resulting when two PWM's and/or laser drivers are disposed in a data transfer system separately for respective trains of the odd-numbered pixel data and the even-numbered pixel data as in the related art. In the case of the known two-channel system, the drawbacks mentioned above with reference to FIGS. 7B, 7C, 8B and 8C may occur because a plurality (at least two) of PWM's are provided and those PWM's differ (vary) in synchronization accuracy and pulse width relative to the horizontal sync signal (BD). In contrast, according to this embodiment, since only one PWM device is used instead of a plurality of PWM's, the problem of deterioration of image quality attributable to variations in device performance can be avoided. Stated another way, it is possible to avoid thickening or thinning of lines or the occurrence of white streaks, and to always stably print an image with high image quality as described above with reference to FIGS. 7A and 8A.

However, if the configuration is just modified so as to use only one PWM, the trains of the odd/even-numbered pixel data cannot be combined with each other, and the odd/even-numbered pixel data cannot be given with a difference (delay) of one pixel. In view of the above, according to this embodiment, the image data of the odd-numbered pixel train and the even-numbered pixel train supplied from the image data I/F 56 are written and read using the respective FIFO memories 113, 114, as described above, so that data rearrangement and combination are performed by introducing a delay in the reading operation. As a result, deterioration of image quality attributable to variations in accuracy of synchronization and pulse width caused between the PWM devices can be suppressed while maintaining the printing speed comparable to that in the related art.

Further, even when the transfer speed of the image data is increased, the image data can be acquired after the image processing unit 57 and the image data I/F 56 have finished the processing of the image data of each line and supply of the processed image data has been positively started, by setting the delay time Tsync2 to a certain appropriate value. Stated another way, in spite of speedup of the clock signal i.e., speedup of the transfer clock for the image data, it is possible to reliably avoid the trouble that the data transfer to the other processing circuit (such as the PWM circuit) in the downstream side is started before the processing of the image data of each line is finished in a completed manner or before the supply of the processed image data is started. Accordingly, even when the transfer clock is sped up, the image data of each line subjected to the image processing can be transferred without missing. As a result, the transfer of the image data can be sped up to increase the image printing speed and to realize a finer resolution of the image, while suppressing an increase of the parts cost, with a relatively simple circuit configuration just enough to delay acquisition of the image data of each line by a certain time when the image data is transferred.

Conversely speaking, even when the image formation clock is sped up with the "higher printing speed" and "finer image resolution", it is possible to reliably avoid the problem that the provision of the delay control circuit 55A between the image data I/F 56 and the PWM circuit 55B makes the processing in the image processing unit 57 and the image data I/F 56 not finished in time, and a desired image cannot be formed because of a mismatch in data read timing and data consistency.

On the other hand, since the read delay control for the image data is performed during transfer of one line, FIFO memories are just required with no need of using a relatively expensive line memory that is employed in the related art. Consequently, the cost of parts necessary in the copying machine can be suppressed.

As another advantage, since writing and delayed reading of the image data are executed in two channels divided corresponding to the image data of the odd-numbered pixel train and the even-numbered pixel train, the processing speed in the upstream-side system including the image data I/F 56 is reduced half on condition that the processing speed in the system downstream of the PWM circuit 55B, which actually forms an image, is the same. Thus, the computation load is reduced. In such a case, the upstream-side system appears from a pseudo aspect such that it can maintain the same processing speed as the downstream-side system. In other words, even when the frequency of the image formation clock is further sped up with the "higher printing speed" and "finer image resolution", the processing speed in the upstream-side system can be kept relatively low. Therefore, the above advantage leads to still another advantage that the computation load of the upstream-side system including the image processing unit and the image data I/F is not required to be so increased regardless of demands for the speedup and the finer resolution.

Note that the present invention is not limited to the above-described embodiment, and can be carried out in various forms without departing from the scope of the present invention set forth in claims, as required, in combinations with the known related art.

This application claims priority from Japanese Patent Application 2005-069857, filed Mar. 11, 2005, which is incorporated herein by reference in its entirety.

What is claimed is:

1. A beam light scanning apparatus comprising:
   light emitting means for emitting a beam light for scan of an image forming apparatus;
   distributing means for distributing data based on image information per pixel of a target image in each line in a direction of main scan into two-channel data trains made up of an odd-numbered pixel data train and an even-numbered pixel data train;
   a first memory provided corresponding to the odd-numbered pixel data train, the first memory allowing reading and writing of the odd-numbered pixel data train;
   a second memory provided corresponding to the even-numbered pixel data train, the second memory allowing reading and writing of the even-numbered pixel data train;
   data writing means for writing the odd-numbered pixel data train and the even-numbered pixel data train distributed by the distributing means into the first memory and the second memory, respectively, in parallel in response to a line sync signal;
   data reading means for reading the odd-numbered pixel data train and the even-numbered pixel data train out of the first memory and the second memory, respectively, in parallel during the same processing cycle corresponding to the line sync signal;
   combining means for combining the odd-numbered pixel data train and the even-numbered pixel data train read out of the first memory and the second memory, respectively, by the data reading means into a data train in the original order of pixels in each line; and
   a single Pulse Width Modulator for generating a driving signal with pulse width modulation based on the data train combined by the combining means.

2. The beam light scanning apparatus according to claim 1, wherein the data reading means is means for reading the data out of the first and second memories after a delay of a predetermined time from start of writing of the data by the data writing means.

3. The beam light scanning apparatus according to claim 2, wherein a frequency of a write clock used by the data writing means for writing the data and a frequency of a read clock used by the read writing means for reading the data differ from each other.

4. The beam light scanning apparatus according to claim 3, wherein the frequency of the write clock is a half the frequency of the read clock.

5. An image forming apparatus comprising:
   a beam light scanning apparatus according to claim 4;
   an image carrier scanned by a beam light emitted from the light emitting means and forming a latent image thereon; and
   a developing unit for developing the latent image formed on the image carrier.

6. An image forming apparatus comprising:
   a beam light scanning apparatus according to claim 3;
   an image carrier scanned by a beam light emitted from the light emitting means and forming a latent image thereon; and
   a developing unit for developing the latent image formed on the image carrier.

7. An image forming apparatus comprising:
   a beam light scanning apparatus according to claim 2;
   an image carrier scanned by a beam light emitted from the light emitting means and forming a latent image thereon; and
   a developing unit for developing the latent image formed on the image carrier.

8. The beam light scanning apparatus according to claim 1, wherein the first memory and the second memory are each a first-in, first-out memory,
   the data writing means includes a writing pointer for managing the number of the data written into each of the memories and data written positions, and
   the data reading means includes a reading pointer for managing the number of the data read out of each of the memories and data read positions.

9. An image forming apparatus comprising:
   a beam light scanning apparatus according to claim 8;
   an image carrier scanned by a beam light emitted from the light emitting means and forming a latent image thereon; and
   a developing unit for developing the latent image formed on the image carrier.

10. The beam light scanning apparatus according to claim 1, further comprising a laser driver for driving the light emitting means by the generated driving signal.

11. An image forming apparatus comprising:
    a beam light scanning apparatus according to claim 10;
    an image carrier scanned by a beam light emitted from the light emitting means and forming a latent image thereon; and a developing unit for developing the latent image formed on the image carrier.

12. An image forming apparatus comprising:
a beam light scanning apparatus according to claim 1;
an image carrier scanned by a beam light emitted from the light emitting means and forming a latent image thereon; and
a developing unit for developing the latent image formed on the image carrier.

13. A method for controlling generation of a beam light, the method comprising:
distributing data based on image information per pixel of a target image in each line in a direction of main scan into two-channel data trains made up of an odd-numbered pixel data train and an even-numbered pixel data train;
writing the odd-numbered pixel data train and the even-numbered pixel data train into a first memory and a second memory, respectively, in parallel in response to a line sync signal, the first memory being provided corresponding to the odd-numbered pixel data train and allowing reading and writing of the odd-numbered pixel data train, and the second memory being provided corresponding to the even-numbered pixel data train and allowing reading and writing of the even-numbered pixel data train;
reading the odd-numbered pixel data train and the even-numbered pixel data train out of the first memory and the second memory, respectively, in parallel during the same processing cycle corresponding to the line sync signal;
combining the odd-numbered pixel data train and the even-numbered pixel data train read out of the first memory and the second memory, respectively, into a data train in the original order of pixels in each line;
generating a driving signal with pulse width modulation based on the combined data train using a single Pulse Width Modulator; and
driving, by the generated driving signal, a light source which emits a beam light for scan of an image forming apparatus.

14. A beam light scanning apparatus comprising:
a light source configured to emit a beam light for scan of an image forming apparatus;
an interface configured to distribute data based on image information per pixel of a target image in each line in a direction of main scan into two-channel data trains made up of an odd-numbered pixel data train and an even-numbered pixel data train;
a first memory provided corresponding to the odd-numbered pixel data train, the first memory allowing reading and writing of the odd-numbered pixel data train;
a second memory provided corresponding to the even-numbered pixel data train, the second memory allowing reading and writing of the even-numbered pixel data train;
a data writing circuit configured to write the odd-numbered pixel data train and the even-numbered pixel data train distributed by the interface into the first memory and the second memory, respectively, in parallel in response to a line sync signal;
a data reading circuit configured to read the odd-numbered pixel data train and the even-numbered pixel data train out of the first memory and the second memory, respectively, in parallel during the same processing cycle corresponding to the line sync signal;
a multiplexer configured to combine the odd-numbered pixel data train and the even-numbered pixel data train read out of the first memory and the second memory, respectively, by the data reading circuit into a data train in the original order of pixels in each line;
a single Pulse Width Modulator configured to generate a driving signal with pulse width modulation based on the data train combined by the multiplexer; and
a laser driver configured to drive the light source by the generated driving signal.

* * * * *